Figure 3:
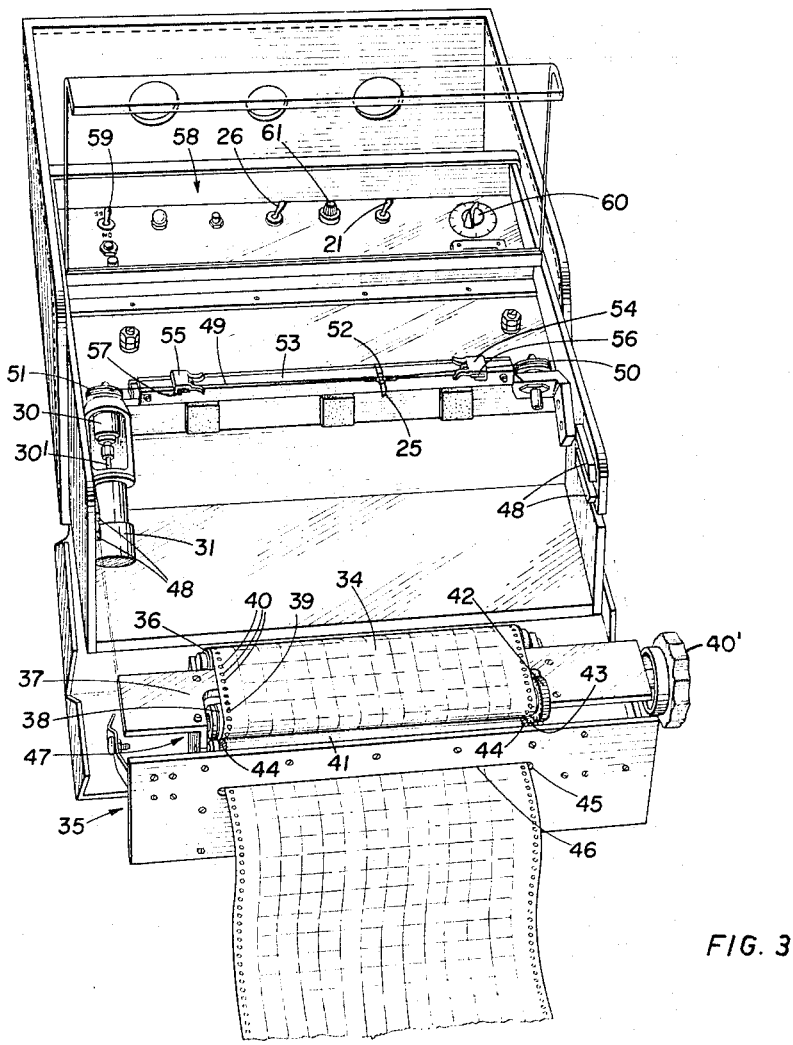

Dec. 20, 1966  N. R. PATERSON ET AL  3,293,596
REFRACTION AND REFLECTION SEISMOGRAPH EQUIPMENT
AND METHOD OF USE
Filed Sept. 17, 1963  3 Sheets-Sheet 1
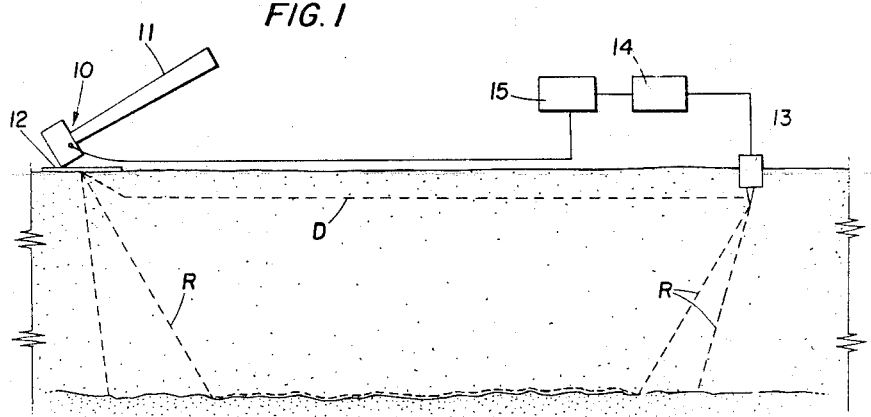
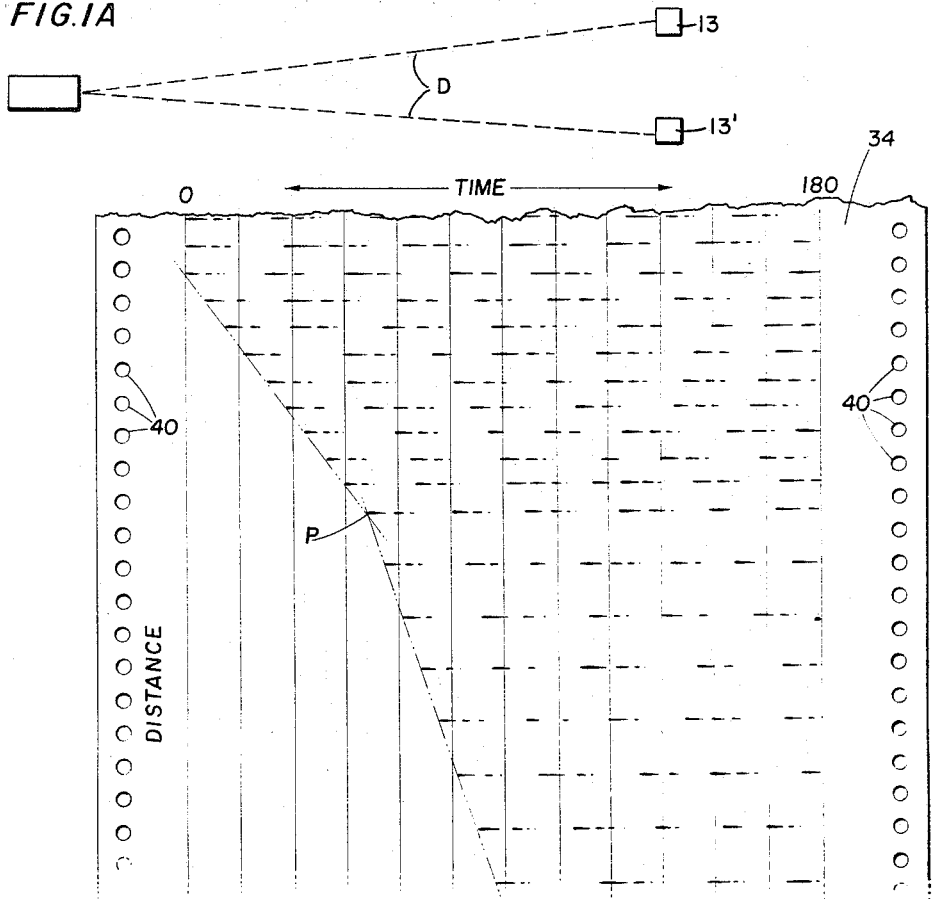
FIG.2
Inventor
NORMAN REED PATERSON
CARL WALTER FAESSLER
by: Cavanagh & Norman

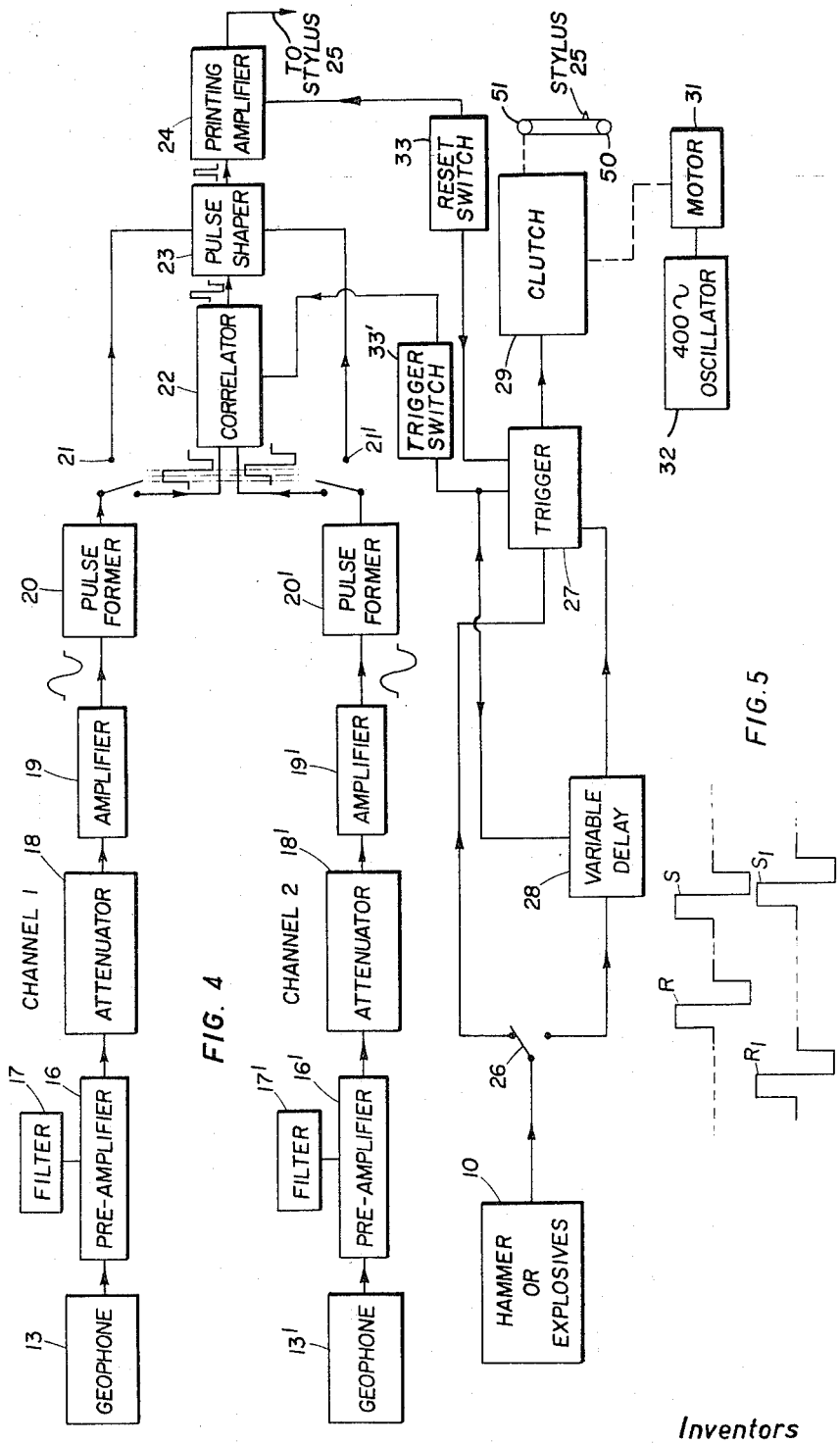

United States Patent Office 3,293,596
Patented Dec. 20, 1966

3,293,596
REFRACTION AND REFLECTION SEISMOGRAPH EQUIPMENT AND METHOD OF USE
Norman Reed Paterson, Toronto, Ontario, and Carl Walter Faessler, Scarborough, Ontario, Canada, assignors, by mesne assignments, to Huntec Limited, Toronto, Ontario, Canada
Substituted for abandoned application Ser. No. 819,078, June 9, 1959. This application Sept. 17, 1963, Ser. No. 318,137
9 Claims. (Cl. 340—15.5)

This invention relates to refraction and reflection seismographic equipment and method of seismographic exploration.

Seismographs have wide application for geophysical exploration, particularly in petroleum exploration, and are also designed to facilitate quick and reliable measurements by acoustic techniques of depth to bedrock or to water table, for example. As no drilling is required, seismology can be useful to civil engineers, architects, contractors and many others.

A particularly useful form of seismology is the refraction technique, in which seismic energy is introduced into the earth at a point, e.g. by a hammer blow, and seismic waves travelling through the earth are picked up by a receiver such as a geophone and displayed or recorded on a seismograph. By varying the distance between the hammer point and the geophone in a series of steps (a hammer blow being taken at each step) and studying the information received at the seismograph, considerable information may be gained concerning the properties of the ground between the hammer point and the geophone.

In the past, when the refraction technique has been used, it has been necessary for the operator of a seismograph to take the results obtained at each hammer blow (the results may be recorded by the operator at the time from a seismograph display or the waves received may be recorded by the seismograph along a continuously moving chart) and then to plot these results on a graph, in order to place the data in a form suitable for interpretation. In particular, in the refraction technique, the times of first arrivals of seismic waves from hammer points at various distances from the geophone must be plotted on a distance-time graph, and from this graph the velocities of seismic waves in the ground and the depth of layers in the ground may be calculated.

This process of separately plotting the results obtained in the field is time consuming and laborious. In addition, the plotting cannot normally be done in the field and hence is often carried out in a more convenient location after the data has been gathered, so that if interpretation of the results then reveals a need for more data at certain points, a further trip into the field may become necessary.

The present invention provides a readily portable seismograph capable of recording receipt of seismic waves, generated by a hammer blow struck at a number of spaced points, all on one chart having a time axis and a distance axis. The times of first arrivals of the seismic waves are recorded along lines parallel to the time axis of the chart, while the distances along the distance axis between recordings of successive seismic events are proportional to the distance between adjacent hammer stations. This is achieved, as will be discussed in more detail shortly, by holding the chart stationary, initiating a seismic pulse, initiating motion of a recording marker across the chart following initiation of the pulse, marking the chart upon receipt of the pulse, returning the marker to its initial position, advancing the chart by an amount proportional to a change in distance between the pulse initiation point and the geophone, and repeating the process. The resulting chart can readily be interpreted in the field, and hence the present invention renders unnecessary in large degree much of the time consuming plotting previously necessary.

Further objects and advantages of the invention will become apparent from a consideration of the following description in conjunction with the drawings in which:

FIGURE 1 shows a diagrammatic layout of the components of the invention.
FIGURE 1A is a plan view showing the arrangement of certain of the elements of FIGURE 1.
FIGURE 2 shows a typical chart obtained from use of the apparatus of the invention.
FIGURE 3 shows a perspective view of the recorder apparatus disassembled to reveal its construction.
FIGURE 4 is a block circuit diagram of the invention showing the functions thereof in schematic form, and
FIGURE 5 is a schematic diagram showing random noise signals and specific seismic pulse signals at a stage in the signal processings circuits.

Referring now to FIGURES 1 and 1A, there is shown generally a source of seismic energy 10 which may be in the form of a hammer 11 and ground plate 12. Alternatively an explosive charge may be substituted for hammer 11 and ground plate 12. Waves emanating from source 10 and reflected or refracted from subsurface layers are picked up by receivers such as electromechanical transducers or geophones 13–13' and passed through signal processing circuits indicated generally at 14 to recorder 15.

In addition source 10 is in direct communication with recorder 15 to provide a trigger for measurement of the delay time. It will be noted that according to the invention geophones 13 and 13' are located spaced apart from one another on the earth's surface and from source 10 whereby the received seismic pulse will be received virtually simultaneously by each said geophone 13 and 13' while random noise pulses will generally be received at different times, thus permitting discrimination of the majority of such noise signals according to the invention as described below.

Referring now to the schematic block diagram of FIGURE 4 it will be seen that the reception and discrimination of seismic pulses is achieved as follows:

Geophones 13 and 13' are each provided with identical signal channels designated Channel 1 and Channel 2 respectively, for processing electrical signals generated in response to seismic pulses received thereby. Each such signal channel comprises a preamplifier 16 and 16' and filters 17 and 17' for amplifying signals within the desired frequency range, and filtering out signals outside such range. In this preferred embodiment the seismic pulse will fall within a broad range of 10 cycles per second to 1000 cps. within which a working range is generally established of between 20 and 200 cps. Accordingly the electrical signals processed will usually fall within the range of 50 milliseconds to 5 milliseconds period, or about 25 m.sec. to 2.5 m.sec. pulse width i.e. period of the positive signal portion.

Attenuators 18 and 18' are adjustable to control the overall signal level to a point just below that of the random noise signals to minimize the noise signal strength in the following circuitry.

Amplifiers 19 and 19' and pulse formers 20 and 20' clip the signals to form them into square wave form and this function may in fact be repeated in particular circumstances. The square waveform signals at this point will still be of corresponding pulse width to the incoming signals that is to say between about 25 msec. and 2.5 msec. and will comprise the specific seismic pulse signal and random noise signals. Channel selection switches 21 and 21' are three position switches operable to connect both Channel 1 and Channel 2 to correlator 22, or alternatively to enable one channel to bypass correlator 22 and feed directly into pulse shaper 23, the other channel being switched out, where it is desired to operate with only one geophone 13.

Assuming both Channel 1 and Channel 2 to be switched to correlator 22 for dual channel operation the function of correlator 22 is to discriminate between the specific seismic pulse signal and random noise signal and to produce a single drive signal from the two seismic signals received. Such drive signal may be of varying pulse width dependent upon the degree of phase difference between the signals in Channels 1 and 2 as well be described below. The drive signal is applied to pulse shaper 23 which then produces a printing amplifier drive pulse of predetermined pulse width of approximately 2 msec. in this preferred embodiment. Printing amplifier 24 and stylus 25 are connected to pulse shaper 23 and are responsive to such constant width drive pulse signal to convert same into a visible marking on a chart.

Before dealing with the recorder apparatus reference is made once more to the function of correlator 22, FIGURE 5 shows in schematic form seismic pulse signals S and S' in Channels 1 and 2 at the input side of correlator 22, followed by random noise R and R'. It will be noted that signals S and S' are approximately 90 degrees out of phase in this example resulting in 50 per cent overlap of the in-phase signal portions. Such a degree of out-of-phase relation is regarded as normal and will result from minor irregularities in the terrain causing one geophone 13 to detect the seismic pulse slightly before or after the other. Correlator 22 will pass only that portion of signals S and S' which in fact overlap and in the case of this particular example the pulse width will thus be reduced by 50%.

Noise pulses R and R', however, will be seen to be out-of-phase by substantially 360 degrees, in this particular example, and as a result correlator 22 will reject both pulses. Obviously some small proportion of random noise will overlap to some extent so that some signals due to noise will be applied to the pulse shaper 23 but in most cases the proportion will be sufficiently small that it can readily be distinguished upon interpretation of the results.

FIGURE 4 also shows in schematic form the circuit arrangement of the seismic pulse generating system which comprises source 10 generating a signal, as by an inertia switch (not shown) which is connectible through delay selection switch 26 either direct to trigger 27 or through a variable delay control 28 to trigger 27, to provide instantaneous or a variable delay time for operation of trigger 27.

Trigger 27 in turn provides a current impulse to operate clutch 30. This current impulse is of predetermined duration to maintain clutch 30 in engagement for a predetermined period and thus apply power from motor 31 to move stylus 25 in a manner to be described below, these mechanical features being included in the block diagram for the sake of completeness. Motor 31 is, in this preferred embodiment, powered by oscillator 32 in known manner. Reset switch 33 provides for manual triggering of trigger 27 for return of stylus 25 to its initial position. The motor 31 will of course be reversed, by means not shown, before reset switch 33 is actuated, in order that the direction of motion of the stylus may be reversed. Reset switch 33 also provides a simultaneous cut out for printing amplifier 24 to prevent printing operation of the stylus during return movement.

Trigger switch 33' is provided to permit testing of the instrument prior to operation and is equivalent to operation of the inertia switch (not shown) incorporated in source 10. As is diagrammatically indicated, trigger switch 33' is connected to the trigger 27 and to the variable delay 28. When the trigger switch 33' is actuated, trigger 27 operates to initiate motion of the stylus across the chart from its initial stationary position. At the same time, a pulse is fed into the variable delay 28. After a predetermined delay this pulse emerges from delay 28 and is applied to correlator 22 to effect the printing of a time calibration mark on the chart. This calibrates the time scale of the chart.

Referring now to FIGURE 3 it will be seen that the chart marking and moving apparatus of this preferred embodiment of the invention are comprised as follows.

The continuous chart 34 is carried in roll form on storage roll 35 from which it is led over idler roller 36 across contact surface 37 and around tension roller 38 provided with teeth 39 registering with perforations 40 in chart 34 for positive movement thereof and having handle 40' attached thereto for manual operation. Pressure roller 41 maintains chart 34 in close contact with tension roller 38 to prevent slippage. In addition tension roller 38 and pressure roller 41 are geared together by gears 42 and 43 for synchronous rotation, and incorporate a click stop device (not shown) for calibration of the distance axis of chart 34 on any desired scale, and pressure roller 41 is further provided with groove 44 for reception of teeth 39 therein. Chart 34 then passes outwardly to the exterior of the instrument through slotted opening 45 provided with serrated edge 46 for tearing off chart 34 after each complete traverse, for example.

The foregoing chart moving mechanism is mounted as a unit in a rigid framework indicated generally at 47 which is removable from the remainder of the instrument for servicing by means of slides 48 and is retained therein by a spring loaded catch (not shown).

The chart marking apparatus of this preferred embodiment incorporates electrical stylus 25 carried between the two ends of monofilament nylon cord 49 running around pulleys 50 and 51. Stylus 25 is provided with contact member 52 in sliding engagement with transverse contact bar 53 for reception of electrical impulses therefrom, such impulses as applied to the chart effecting marking of the chart in well known manner. Buffer members 54 and 55 are provided at each end of the path of movement of stylus 25 and incorporate small permanent magnets 56 and 57 to eliminate rebounding of stylus 25 therefrom.

Pulley 50 in this embodiment is an idler and pulley 51 is attached to clutch 30 which is in turn connected by spindle 30' to electric motor 31, whereby operation of clutch 30 after a small constant delay applies full power to pulley 51 rotating it to draw stylus from one side of chart 34 at buffer 54 to the other at constant speed. The clutch 30 is maintained in engagement for a predetermined period, and released when the stylus 25 is at a point just short of the further buffer 55, the slight momentum of the stylus, pulley mechanism, and the part of the clutch attached thereto being sufficient to complete the travel. It will be apparent that the relatively slight momentum acquired by these parts indicates a low total mass and hence a low acceleration load on the motor when the clutch is engaged, so that the stylus 25 can rapidly be brought up to full speed. The small constant delay referred to in bringing the pulley and stylus up to speed is of course allowed for in the calibration of the time axis of the chart.

Control panel 58 is provided with, inter alia, an on-off switch 59, an attenuator adjustment control knob 60, and a neon bulb 61 responsive to attenuators 18 and 18' to indicate the level of ambient noise signals passing therethrough.

In operation, to determine the nature of underlying materials, i.e. either loose or compacted and the depth to such layers, the refraction method is used.

The quantity that is observed in the refraction method of seismic investigation is the time between the initiation of the seismic wave at the shot point by hammer blow or explosion and its first arrival at a detector (a geophone) placed at a measured distance from the shot point. As the first arrivals only are usually considered in the analysis, the wave arriving at the detector first must be the one which has travelled the minimum time path between shot point and detector. Thus by observing first arrivals for different separation of source and receiver, a time-distance curve can be constructed representing variations of minimum time path with distance. From these variations, the nature and depth of the elastic discontinuities can be deduced.

It will be seen that while the geophones 13, 13' are close to source 10 the first arrival will be the direct pressure wave D, travelling in a straight line through the surface (See FIGURES 1 and 1A). However, as the distance of separation increases the refracted wave R will overtake the direct wave D, due to the increased speed of travel along the face of layer L and refracted wave R will thereafter appear as the first arrival. The point at which the changeover takes place is identifiable by interpretation, as at point P on chart 34 (See FIGURE 2) and gives significant information concerning the earth structure.

First the location is picked for the geophones; (if there is little or no noise only one geophone may be required). The geophones must be firmly placed in the ground in a vertical position. Hammer stations should be laid out next, readings generally taken while the direct wave D is the first arrival and at 20-foot intervals thereafter when the refracted wave R is the first arrival, for example. The on-off switch 59 is next placed in on position to prepare the seismograph for recording and in particular to commence operation of the motor 31. The attenuator 18 (assuming for purposes of explanation that only one geophone 13 and its associated channel are to be used) is next adjusted such that noise picked up by the geophone will not cause the printing amplifier to be triggered, i.e. the noise is attenuated below the threshold level of amplifier 19 and pulse former 20. Naturally, the attenuator setting should not be made so low that the first arrival seismic pulse received at the geophone from the hammer will fail to effect operation of the printing amplifier.

Next, with the chart stationary, the ground plate 12 is struck with the hammer 11. The inertia switch (not shown) on the hammer 10 closes to operate the trigger 27 to operate the clutch 30 and initiate motion of the stylus 25 across the chart. When the first arrival seismic pulse is received at the geophone 13, this pulse is processed through channel 1 to effect operation of the printing amplifier 24 thus to cause marking of the chart. Later arrivals cause further marking of the chart during the transverse motion of the stylus, thus generating one of the transverse lines of markings shown in FIGURE 2.

The hammer and ground plate are now moved to the next hammer station, and the knob 40' is turned to advance the chart a distance proportional to the change in distance between the ground plate 12 and the geophone 13. With the chart held stationary by the pressure and friction of the rollers, another blow is then taken to repeat the recording process, thus producing another line of the markings of FIGURE 2. Repetition of this procedure yields a plot of the type shown in FIGURE 2. from which various properties of the terrain being studied can readily be ascertained.

When the correlator is used, the two geophones should be placed at equal distances from the hammer line and at right angles to it. When this requirement is followed, the distances measured along the hammer line will not be the exact distances measured from the hammer to either geophone. This "error" is not important at geophone hammer separations of over fifty feet. For distances up to fifty feet from either geophone, only one channel and therefore only one geophone should be used, and distances should be measured from the effective geophone. After moving out to about fifty feet, the correlator could be switched in and the readings taken in the same fashion as previously. After completion of the trasverse, examine the record and join the printed marks which are on the same straight lines.

In reflection surveying for depth measurements of subsurface layers the correlation method should always be used, as in this case it is important to subdue both noise and direct arrivals. To do this the geophones are placed in line with the selected hammer point. The geophones should be about 15 feet apart, i.e. approximately one half a wave length (in an average medium). The distance of the hammer point from the closest geophone depends upon the depth being investigated. Twenty-five feet is a typical figure.

Since the two geophones are in line with the hammer point but at different distances from it, any noise coming from the general direction of the hammer point or from the opposite direction reaches the two geophones at different times and is cancelled out in the correlator. The same holds true for any direct arrivals resulting from the hammer blow. The reflected signals on the other hand, if the depth is much greater than the separation of geophones and hammer, arrive in phase at the two geophones, and are therefore recorded. In addition, since the depth is considerable it will usually be possible to apply a substantial delay, up to 160 milliseconds, to the operation of stylus 25 in which case marking of chart 34 will not take place during this period. In this way considerable random noise, and, in addition, the direct waves and refracted waves can be eliminated from chart 34 since they will usually be over within the delay time.

Since, in reflection work, the distance between the hammer point and the geophones is kept fixed, several readings can be taken at the same station for definite identification of the reflected signal. Once the reflection is properly identified, time can be easily read from the recording on the paper. Knowing the average velocity of overburden, depth determination can be carried out from known principles.

The operation of the apparatus is the same for both methods of use, i.e. the equipment works in a similar manner for both the refraction and reflection methods.

As an example, upon the seismic signal being generated by hammer 10, trigger 27 initiates the mechanical portions of the device.

The seismic wave emanating from the shock, being propagated through the underground strata is either passed direct or refracted by same. One or both geophones 13, 13' receive this signal which is then fed through the preamplifier 16. If frequency selection is desirable, the signal may be first fed through the filter 17 whereby a preselected range of frequencies is obtained.

The amplified signal is then processed through attenuator 18 to reduce the signal strength, whereby the noise received by geophones 13 or 13' is reduced. Further amplification by amplifier 19 or 19' produces a signal suitable for use by pulse former 20 or 20'.

The pulse former 20 produces a square wave pattern signal which is fed either to the correlator 22, or as in the case of only one geophone being used, directly to pulse shaper 23. The correlator 22 will pass only those portions of both channel signals which overlap. Thus each seismic signal being partially in phase, one with the other, are passed through. However, random noise, being for the most part out of phase is refused.

The pulse shaper 23 separates the signal to provide a series of pulses formed from the positive zero crossings of the square wave. These pulses provide the drive for the printing amplifier 24 which in turn activates the stylus 25 to form the printed image on chart 34, which is formed of electro sensitive paper for the purpose.

The trigger 27 also provides a signal to clutch 30 through adjustment 29, whereby drive motor 31 is engaged to cause stylus 25 to traverse graph 34 at a predetermined rate.

In the case that an extended period of time for recording incidents is required, the variable delay 28 may be placed in circuit with trigger 27 to extend the time of stylus travel.

The foregoing is a description of a presently preferred embodiment of this invention, and is given by way of example only, other variations being contemplated, such as may fall within the scope of the appended claims.

What we claim is:

1. The method of seismic exploration, employing a chart and a recording marker, in which a seismic energy pulse is initiated at a given point and received at a selected distance therefrom, the steps being repeated at varying distances and the pulses recorded on said chart in the form of a two-dimensional, time and distance plot comprising the steps of: holding said chart stationary; holding said marker stationary at a position at one side of said chart; initiating a seismic pulse at a given point; initiating motion of said marker at constant velocity from said one side of said chart to the other in response to initiation of said pulse, said motion being along a first traverse line parallel to the time axis of said chart and spaced therefrom by a distance proportional to said distance between said pulse initiation point and the receipt thereof; causing said marker to mark said chart in response to receipt of a pulse during motion of said marker as aforesaid; returning said marker to its stationary position at said one side of said chart; moving said chart along its distance axis an amount proportionate to a change in said selected distance, holding said chart stationary again and repeating motion of said marker along a second traverse line and causing the same to mark said chart as aforesaid; the foregoing steps being repeated at least once for every distance between said pulse initiation point and the receipt thereof.

2. A portable seismograph, for use with a receiver and a seismic energy source capable of initiating seismic waves in the earth at a selected distance from said receiver, said source including means movable to vary said distance, said receiver producing a signal upon receipt of said seismic wave, said seismograph comprising:
    (a) chart storage means, for a chart of the type having transverse and longitudinal dimensions,
    (b) a recording marker for marking said chart,
    (c) chart advancing means for advancing said chart longitudinally past said marker and including
        (i) chart drive means operable for advancing said chart,
        (ii) and manually operable means for operating said chart drive means in predetermined increments, for advancing said chart stepwise in amounts proportional to changes in distance between said source and said receiver and for holding said chart stationary between advances, the longitudinal dimension of said chart thus representing distances between said source and said receiver,
    (d) marker drive means coupled to said marker and normally holding said marker in an initial stationary position at one side of said chart, said marker drive means being operable to drive said marker from said initial position across said chart at constant velocity,
    (e) means adapted to be coupled to said source and responsive to operation thereof for operating said marker drive means following initiation of seismic waves at said source,
    (f) and marker actuating means coupled to said marker and adapted to be coupled to said receiver, said marker actuating means being responsive to receipt of a signal at said receiver to cause said marker to mark said chart, thus to constitute the transverse dimension of said chart a time axis for indicating time of travel of a seismic wave from said source to said receiver, so that, when a seismic wave is initiated at said source, said means (e) operates to initiate motion of said marker across said chart while said chart is stationary, said means (f) upon receipt of a seismic wave at said receiver then actuating said marker to cause the latter to mark said chart, whereby said marker may then be returned to its initial position, the distance between said source and said receiver may be increased by a given distance, said chart may be advanced by said means (c) by an amount proportional to said given distance, and new seismic waves may then be initiated at said source and recorded.

3. A portable seismograph according to claim 2 wherein said chart includes a series of sprocket holes along one longitudinal edge thereof and said chart drive means comprises a drive roller having gear teeth at one end thereof for cooperation with the sprocket holes in the chart to advance the chart, and a pressure roller adjacent said drive roller to press said chart against said drive roller to ensure engagement of said gear teeth in said sprocket holes, said pressure roller including a circumferential groove at an end thereof to accomodate said teeth of said drive roller.

4. A portable seismograph according to claim 2 wherein said means (e) comprises
    (i) a motor operable at a predetermined constant speed, and means for initiating operation of said motor prior to initiation of a seismic pulse,
    (ii) and clutch means connected between said motor and said marker drive means, said clutch means being operable in response to receipt of a start signal from said source indicating that seismic waves have been initiated at said source to couple said motor to said marker drive means thus to drive said marker from its initial position across said chart.

5. A portable seismograph according to claim 2 wherein said means (e) comprises
    (i) a motor operable at a predetermined constant speed, and means for initiating operation of said motor prior to initiation of a seismic pulse,
    (ii) and clutch means connected between said motor and said marker drive means, said clutch means being operable for a predetermined period in response to receipt of a start signal from said source indicating that seismic waves have been initiated at said source to couple said motor to said marker drive means thus to drive said marker from its initial position across the chart, said predetermined period being of duration sufficient for said marker to travel across a substantial portion of the transverse dimension of said chart.

6. A portable seismograph according to claim 4 wherein said clutch means includes an electrically operable clutch, and trigger means responsive to said start signal to produce an electrical signal to operate said clutch.

7. A portable seismograph according to claim 6 wherein said marker drive means comprises a pulley mechanism of relatively low mass, to facilitate rapid acceleration of said marker upon operation of said clutch means.

8. A portable seismograph according to claim 4 wherein said marker actuating means (f) includes
    (i) input means for receiving signals from said receiver,
    (ii) variable gain means coupled to said input means for reducing noise signals picked up by said receiver thus to reduce the likelihood of actuation of said marker by noise in the absence of receipt of a seismic wave by said receiver,

- (iii) amplifying and clipping means coupled to said variable gain means for transforming signals from said variable gain means into square wave signals,
- (iv) pulse generating means coupled to said amplifying and clipping means and responsive to receipt of square wave signals therefrom to produce pulse signals of predetermined duration,
- (v) and printing amplifier means coupled to said pulse generating means and to said marker and responsive to receipt of a pulse from said pulse generating means to cause said marker to mark said chart.

9. A portable seismograph according to claim 8 wherein said chart is of electro sensitive paper, said marker is a pointed conductive stylus for contacting said chart, and said printing amplifier is operative on receipt of a pulse from said pulse generating means to apply an electrical impulse to said marker.

References Cited by the Examiner

UNITED STATES PATENTS

| | | | |
|---|---|---|---|
| 2,003,780 | 6/1935 | Born | 181—.5 |
| 2,972,733 | 2/1961 | Bucy | 340—15.5 |
| 3,191,181 | 6/1965 | Moyano | 346—141 X |
| 3,208,547 | 9/1965 | Gregory et al. | 340—15.5 X |

OTHER REFERENCES

Gough, A New Instrument for Seismic Exploration at Very Short Ranges, Geophysics, v. 17, No. 2, April 1952, pp. 311–321 and 330–333.

SAMUEL FEINBERG, *Primary Examiner.*

BENJAMIN A. BORCHELT, *Examiner.*

R. M. SKOLNIK, *Assistant Examiner.*